Aug. 17, 1954 S. L. REICHES 2,686,871

PIEZOELECTRIC CRYSTAL AS A FREQUENCY DISCRIMINATOR

Filed March 22, 1949

INVENTOR.
SOL L. REICHES
BY Wade Koontz AND
ATTORNEY
James S. Shannon
AGENT

Patented Aug. 17, 1954

2,686,871

UNITED STATES PATENT OFFICE 2,686,871

PIEZOELECTRIC CRYSTAL AS A FREQUENCY DISCRIMINATOR

Sol L. Reiches, Cleveland, Ohio

Application March 22, 1949, Serial No. 82,892

5 Claims. (Cl. 250—27)

(Granted under Title 35, U. S. Code (1952), sec. 266)

The invention described herein may be manufactured and used by or for the Government for governmental purposes without payment to me of any royalty thereon.

This invention relates to frequency discriminator circuits and particularly to such circuits employing piezo-electric crystals. It is the object of the invention to provide a frequency discriminator having high sensitivity and a high degree of linearity.

Frequency discriminator circuits are used whenever it is desired to produce a voltage or current whose amplitude varies in accordance with frequency variations of a given wave, as, for example, in automatic frequency control systems or in receivers for frequency modulated waves.

Discriminators employing resonant circuits made up of conventional inductance and capacity elements have the disadvantage of low sensitivity; or, in other words, the ratio of the change in output voltage to a change in frequency of the incoming wave is relatively low. This is due to the resistance loss present in even the best designed resonant circuits of this type. It is well known that a piezo-electric crystal mounted in its holder is the equivalent of a series resonant circuit shunted by the capacity of the holder and that the resonant circuit has very low loss or a very high Q. By taking advantage of this fact discriminator circuits of very high sensitivity may be obtained.

The invention consists briefly in connecting a piezo-electric crystal between the anode and cathode of a vacuum tube stage of the type employing an impedance common to the input and output circuits for the production of negative feed back. The crystal causes the load impedance of the tube and also the feed back across the common impedance to vary with frequency. These two effects cause a large variation in the output of the stage for a small variation in input frequency while maintaining a very nearly linear relationship between the output amplitude and the frequency of the incoming signal.

The details of the invention will be described in connection with the accompanying drawings in which.

Figure 1:
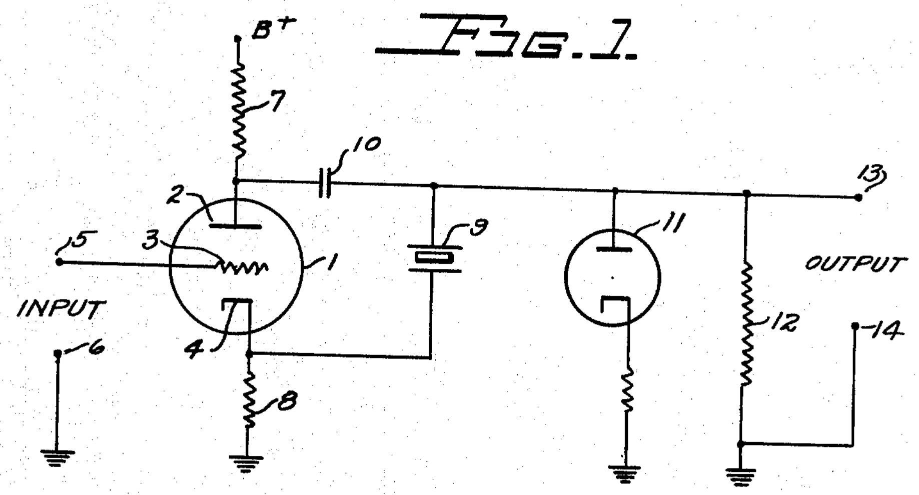
Fig. 1 shows a discriminator circuit in accordance with the invention.

Referring to Fig. 1, 1 is a vacuum tube having an anode 2, a grid 3 and a cathode 4. An input circuit including input terminals 5 and 6 is connected between the grid and ground. Operating potential is applied to the anode from a source of positive potential B+ through anode resistor 7. The cathode 4 is connected to ground through feed back resistor 8. One terminal of piezo-electric crystal 9 is connected to the anode 2 through blocking condenser 10. The other terminal of the crystal is connected to the cathode 4. The diode 11 is connected in shunt to the output of the stage and rectifies the output signal to produce a direct voltage across diode load resistor 12. This voltage may be taken from output terminals 13 and 14. It will be noted that the load impedance for the tube 1 is made up of two parallel branches. One branch contains anode resistor 7, diode 11 and the resistor 12 all connected in parallel with this parallel combination connected in series with feed back resistor 8. The other branch of the load impedance consists of the crystal 9. The signal applied to terminals 5 and 6 would normally be a signal having a constant amplitude but varying in frequency in accordance with some modulating signal. One occurrence of a signal of this type is in the output circuit of the limiter in a receiver for frequency modulated waves. Variations in frequency of the incoming signal cause changes in the reactance provided by crystal 9, which causes the load impedance of the tube to vary. Likewise changes in the reactance of crystal 9 affects the amplitude and phase of the feed back voltage developed across resistor 8. The voltage between the grid 3 and cathode 4, which is the voltage effective in controlling the plate current of the tube, is equal to the vector sum of the input voltage and the feed back voltage developed across resistor 8. Therefore the voltage between grid and cathode is caused to vary with variations in feed back voltage resulting from changes in frequency. The combined effect of changes in the load impedance of the tube with frequency and changes in the feed back voltage with frequency causes the output of the tube and the direct voltage developed between terminals 13 and 14 to vary with frequency.

Figure 2:
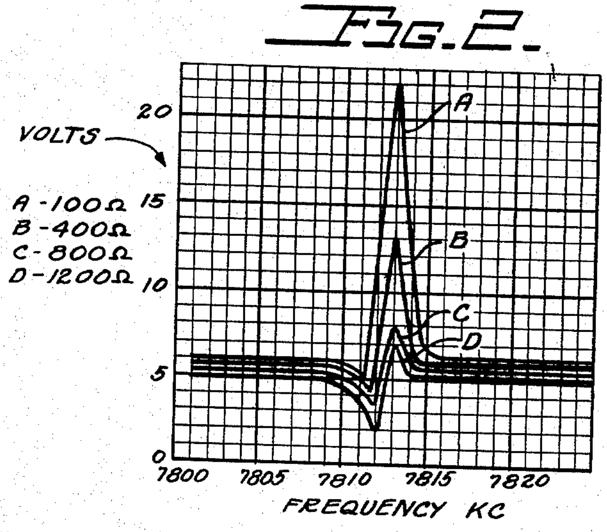
Fig. 2 is a set of curves showing the relationship between output voltage and frequency for various values of cathode resistor 8.
Figure 3:
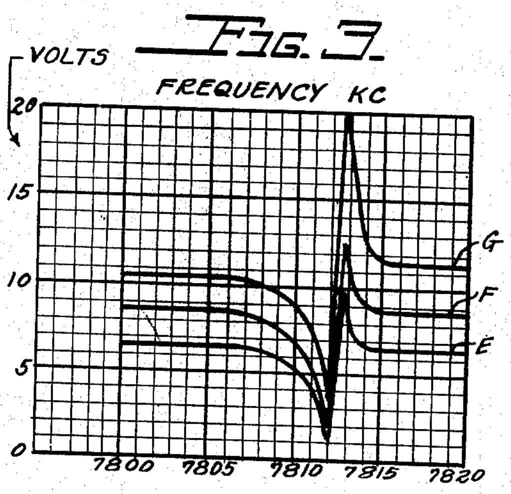
Fig. 3 shows a set of curves illustrating the relationship between output voltage and frequency for various input signal levels.

In Fig. 2, the relationship between the voltage at terminals 13 and 14 and the frequency of the signal applied to terminals 5 and 6 is shown for four different values of resistor 8. The crystal frequency in this case was 7810 kc. The curve A shows the relationship for a cathode resistor of 100 ohms, the curve B for a cathode resistor of 400 ohms, the curve C for a cathode resistor of 800 ohms and the curve D for a cathode resistor of 1200 ohms. Fig. 3 shows a similar relationship for various input signal levels, the curves E, F and G being taken at increasingly higher levels of input signal. It will be noted that all of the curves show a high degree of linearity between output voltage and input signal frequency and that by proper choice of cathode resistor very high sensitivity, or a large change in output voltage for a small change in input signal frequency, may be obtained.

I claim:

1. A discriminator circuit comprising a vacuum tube having an anode, a cathode and a control grid, an input circuit connected between said control grid and said cathode, said input circuit containing in series a means for connecting said discriminator circuit to a source of constant amplitude variable frequency signal and a feed back impedance, an output circuit connected between the anode and cathode of said tube, said output circuit containing a load impedance part of which is made up of said feed back impedance, a piezoelectric crystal connected between said anode and said cathode and in shunt to said load impedance, and means for rectifying the output voltage developed across the part of the load impedance not included in said feed back impedance.

2. A discriminator circuit comprising a vacuum tube having an anode, a cathode and a control grid, means for connecting said discriminator circuit to a source of constant amplitude variable frequency signal said means being connected between said control grid and ground, a feed back impedance, means connecting said feed back impedance between said cathode and ground, an anode impedance, means connecting said anode impedance between said anode and ground for signal frequencies, a piezo-electric crystal, means for maintaining one terminal of said crystal at anode potential and the other terminal of said crystal at cathode potential for signal frequencies, and rectifying means connected between said anode and ground.

3. A frequency discriminating circuit comprising an amplifier tube having an anode, a cathode and a control grid, an output impedance and a feedback impedance connected in series between the anode and cathode of said tube, an input circuit including said feedback impedance and a source of variable frequency signal voltage connected between the cathode and grid of said tube, and a piezoelectric crystal in a capacitive holder connected between the anode and cathode of said tube and in parallel to said series connected output and feedback impedances.

4. Apparatus as claimed in claim 3 in which said output and feedback impedances are resistive.

5. Apparatus as claimed in claim 4 in which a rectifying means is coupled to said output impedance for the purpose of rectifying the voltage developed thereacross.

References Cited in the file of this patent

UNITED STATES PATENTS

| Number | Name | Date |
|---|---|---|
| 1,938,657 | Hansell | Dec. 12, 1933 |
| 2,172,732 | Crosby | Sept. 12, 1939 |
| 2,338,526 | Maynard | Jan. 4, 1944 |
| 2,341,240 | Reid | Feb. 8, 1944 |
| 2,428,264 | Crosby | Sept. 30, 1947 |